Dec. 31, 1957

J. D. BENFIELD 2,817,986

PIPE AND TUBING BENDER

Filed June 21, 1954

INVENTOR.
John D. Benfield
BY
ATTORNEY

Dec. 31, 1957  J. D. BENFIELD  2,817,986
PIPE AND TUBING BENDER

Filed June 21, 1954  2 Sheets-Sheet 2

INVENTOR.
John D. Benfield
BY
ATTORNEY

2,817,986
PIPE AND TUBING BENDER

John D. Benfield, Detroit, Mich.

Application June 21, 1954, Serial No. 438,031

3 Claims. (Cl. 81—15)

My present invention relates to a pipe and tubing bender and is an improvement upon that of my prior United States Letters Patent No. 2,584,537 issued February 5, 1952. It has to do with an improved portable tool or device for bending either pipe, raceway, conduit, or tubing "on location"; i. e. at the place or point of installation of the pipe, raceway, tubing, or conduit.

Prior to the present invention, pipe and tubing benders have been built strictly for the purpose of producing the desired bend in a piece of pipe or tubing. No means has been provided for allowing the operator to unbend or "true up" the pipe or tube by straightening it or by removing from it a few degrees of arc. Moreover, with previously known pipe and tubing benders, the hook portion of the bender has often concealed from view the pencil or other guide marks placed on the pipe by the electrician as an aid to accuracy in bending. This has been particularly noticeable in the case of left-handed operators who find it more convenient to work from the so-called "back" of the hook portion. These defects or short-comings of the known prior art benders have been entirely overcome by the improved bender of my present invention. In addition, my new bender permits the precision bending of heavywall pipe or conduit as well as the precision bending of thinwall pipe or conduit.

One of the objects of the present invention is to provide an improved bender capable of producing, with relative ease, facility and accuracy, a true-radius bend in a piece or length of pipe, raceway, rod, conduit, or tubing and one which is also capable of straightening the pipe or of removing a few degrees of arc from the bend.

Another object of the invention is to provide a bender as aforesaid having means permitting the operator to see the guide mark he has previously made on the pipe no matter which side of the pipe the mark is on, thus enabling him to make an accurate bend; a further object being to provide such means which permits the use of the bender by either right-handed or left-handed electricians or other operators with equal ease, facility and accuracy.

The foregoing and other objects and advantages of my invention will appear from the following description and appended claims when considered in conjunction with the accompanying drawings wherein like reference characters designate corresponding parts in the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not of limitation, and it is not intended to limit the invention claimed herein beyond the requirements of the prior art.

Referring now particularly to the drawings, there is shown therein one form of my improved portable pipe and tubing bender embodying the present invention and incorporating the features of the back pusher and peek hole or opening. The bender is preferably formed from metal and in the present instance is a one-piece casting, although if it is desirable, it may be produced by other methods. Moreover, it may be formed in several parts rather than as a single casting.

Figure 1:
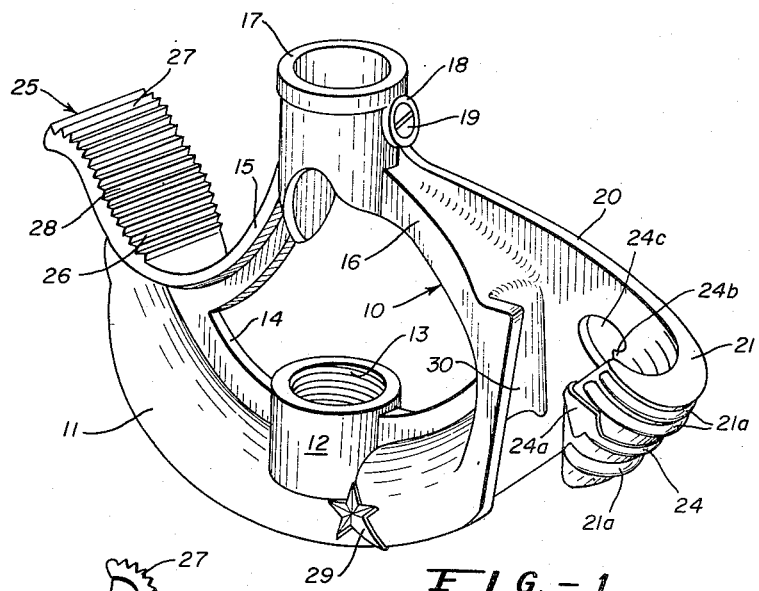
Fig. 1 is a perspective view of the bender of my invention.
Figure 2:
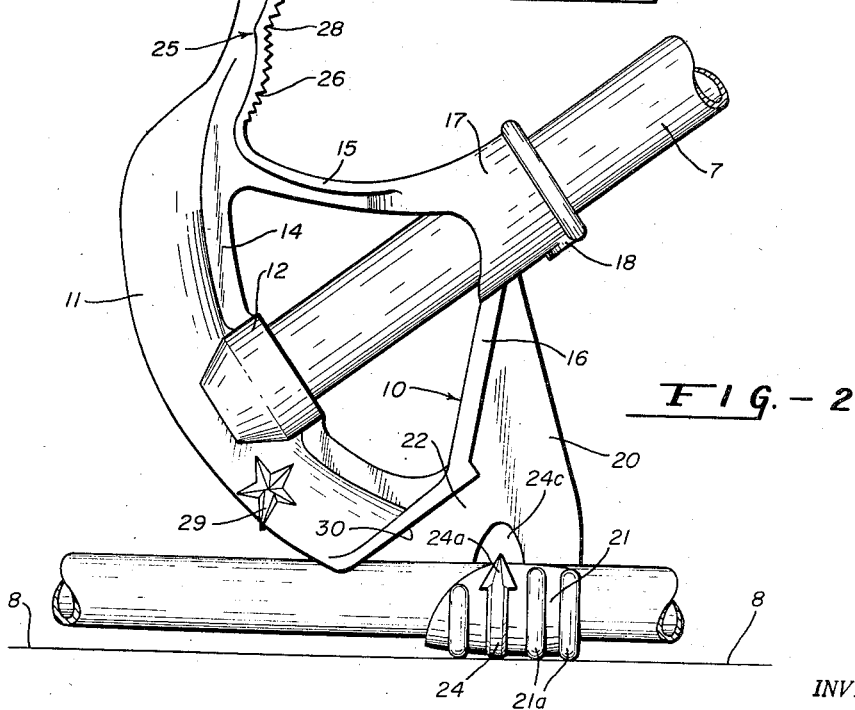
Fig. 2 is a side elevational view of the same, partly broken away, and showing the operating handle in place.
Figure 3:
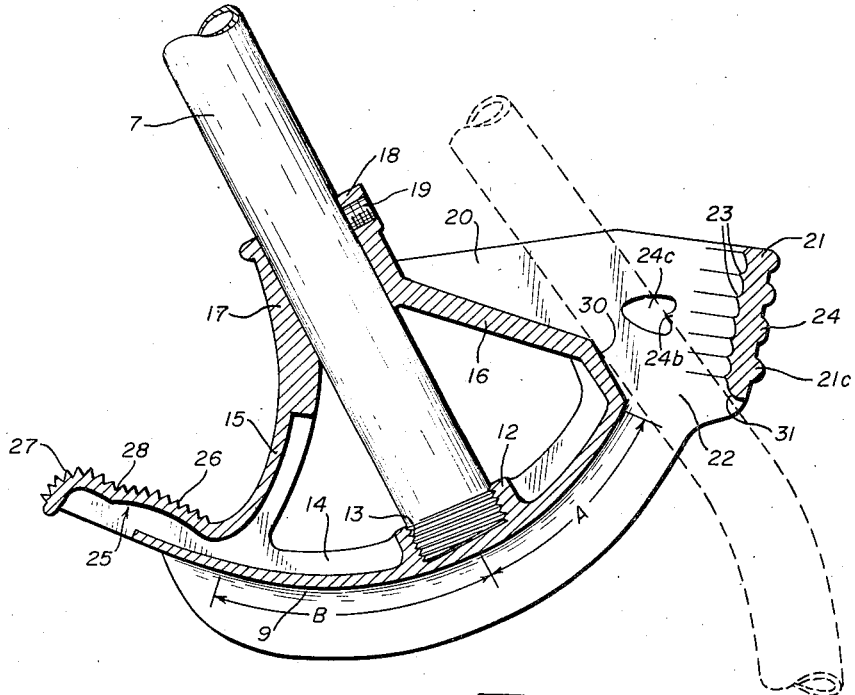
Fig. 3 is a vertical sectional view illustrating the use of the bender.

As seen in Fig. 2, the bender is poised on the floor or other surface 8 in its starting position and comprises a body portion, shown as a whole at 10, having a rocker or curved footlike or base portion 11 whose inner and central portion is shaped or formed to provide a socket 12 which may be interiorly threaded at 13, as seen in Figs. 1 and 3. The rocker-like base portion 11 is of inverted substantially U-shaped cross section and has an inner and preferably centrally disposed longitudinal reinforcing rib 14. A pair of arms or upright members 15 and 16 extend upwardly and in converging relationship from the base or rocker portion 11. They terminate at their end portions in a preferably tubular guide or handle-supporting sleeve 17 to receive and support a handle 7, a portion of which is shown in each of Figs. 2, 3 and 5. The sleeve is provided with a boss 18 which is threaded to receive a set screw 19. The set screw is for purposes of safety as it prevents rotation and accidental displacement or loosening of the operating handle 7. This handle 7 extends through the guide sleeve 17 and has its lower end externally threaded to engage the threads 13 of the base socket 12. After the handle has been inserted through the sleeve and threaded into the base socket, the set screw 19 is screwed down to hold the assembly rigidly in place. The arms or upright members 15 and 16, together with the rib portion 14 of the base of the bender, define or frame a relatively large opening in the body portion of the tool, as may be clearly seen in Figs. 1, 2 and 3.

Figure 4:
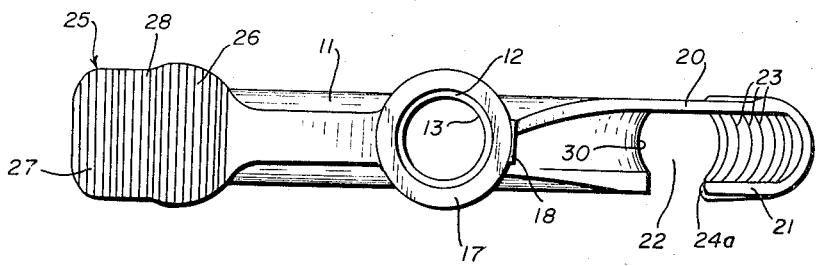
Fig. 4 is a top plan view of the bender when in upright position.
Figure 5:
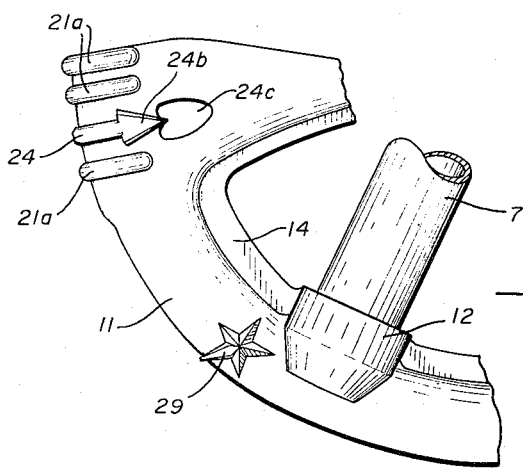
Fig. 5 is a fragmentary detail view showing the opposite side of the bender from that seen in Fig. 2.

The upwardly extending arm or portion 16 has a wide and preferably flat end wall or extension 20 which merges with the rocker-like base 11 at one side of a longitudinal groove 9 formed in said base. This portion 20 extends outwardly and downwardly and is reversely curved at 21 to provide an entrance throat 22 for the longitudinal groove 9. The inner surface of the guide and pipe or tube-supporting portion 21, which is known to the trade as the "hook" of the bender, is preferably provided with a series of transverse teeth or upwardly projecting ribs 23, see Fig. 4. As shown in Figs. 1, 2 and 5 the hook 21 is provided on its outer surface with a double-headed arrow or indicator 24. The arrow 24 has an arrow head 24a at the edge of the open portion of the hook 21. The arrow extends continuously from this side or edge of the hook 21 entirely around the hook and terminates in a head 24b (see Fig. 5) at the edge of a tear drop-shaped peek hole or opening 24c formed in the hook. Thus, it will be seen, that the arrow heads 24a and 24b are diametrically opposite each other and it will further be seen that the peek hole 24c makes visible the operator's guide mark on the pipe to be bent. Moreover, the arrow heads 24a and 24b indicate the proper positioning of the bender on the conduit or tube for the accurate fabrication of bends commonly referred to by the trade as "stubs." It is to be noted that the nonskid solid hook 21 is extra wide and is reinforced by a series of external ribs 21a. It will be understood that when the bender is in use, the double-headed arrow or indicator 24 serves as a base mark for accurately gaging bends in the pipe, tubing, or conduit to be bent by the device. The curved base 11 of the bender is also provided with a so-called "star-point" or indicator 29 which indicates for the operator the exact point at which the tool is to be placed on the pipe so as to offset the shrink-back on a 90° sweep. Preferably, both faces of the base 11 are provided with "star-points."

The end of the rocker-like base or foot portion 11 of the device which is at the opposite side of the hook or so-called mouth portion of the longitudinal groove 9, is extended outwardly beyond the arm 15 to provide a bending foot treadle having an eccentric contour, shown as a whole at 25. The foot treadle 25 comprises portions 26 and 27 which merge at the point 28. It will be noted that the curvature of the portion 26 of the treadle is less than the curvature of the portion 27. Thus, in the starting position of the present tool, the foot of the operator will first engage the portion 27, and if a full 90° arc is made, his foot pressure is shifted to engage portion 26. This eccentric contour therefore invites foot pressure to be continually applied at the point of greatest leverage.

As shown in Fig. 3, it will be seen that the longitudinal arcuate groove 9 is eccentric and has on the particular size illustrated an arc of six (6) inch inside radius for a distance of approximately 40 degrees of arc, as indicated by the arrow "A," which radius "fades" into or merges with an arc curved on a four (4) inch inside radius for the remaining 60 degrees of the 100 degree of the arc. This latter, or arc curved on a four (4) inch inside radius, is indicated by the arrow and the letter "B." In other words, the arc of the inside radius of the groove 9 constituting the two merging portions indicated by the letters "A" and "B," is eccentric.

It is easier, of course, to make a long radius bend in a pipe or tube than a short radius bend. It is also known that the first one-third or from 33⅓ degrees to 40 degrees of the bend presents the greatest bending resistance and is therefore the hardest to produce. By virtue of my invention, the easier long radius bend is made over the first 40 degrees of the arc where the bending resistance is greater and the relatively more difficult short radius portion of the bend for 60 degrees of the arc is made where the bending resistance is lesser because the pipe or tubing is supported over a large surface and the leverage is greater. Because of this and even though the end result of the bending operation with the present invention is a true radius, four (4) inches in this instance, it has required no more effort on the part of the operator or electrician than if he were actually making a six (6) inch radius bend over the first and difficult 40 degrees arc, which is represented by the letter "A" in Fig. 3. The reason this is true is explained in the following paragraph.

While it may appear that an untrue radius would or could be produced because of the combination of the six (6) inch radius of the arc and the four (4) inch radius of the arc, actually the pipe or tubing is bent to an even truer radius than if the groove 9 had a single four (4) inch inside radius of arc for the full distance of the 100 degree arcuate groove. This is true because it is an inherent characteristic of pipe or tubing to require extra initial bending stress over the first 40 degrees of arc of bending; it therefore has a marked tendency to jump out of the groove or "hump up" and ride up and away from the bottom of the arcuate groove 9, thereby bending at a sharper radius than called for by the groove. Even with foot pressure being applied to the treadle 25, the pipe or tubing tends to ride up and away from the bottom of the groove, but in my invention, by so doing it humps itself into a true four (4) inch radius of arc for the distance shown by arrow "A" in Fig. 3 even though in this case the groove itself for that distance is a six (6) inch radius of arc. Therefore, the larger six (6) inch radius of arc, represented by the letter "A" in Fig. 3, compensates for this condition, the result being that the pipe or tubing rides up in the arcuate groove 9 just enough to compensate for the natural "humping up" which takes place thereby resulting in a more uniform radius than would occur in the tools which employ the conventional single radius of arcuate groove.

The hook 21 is so shaped and proportioned to allow for "back-play." By virtue of the structure of the hook 21, the pipe or tubing being bent is given a chance to "give" or "bow" gently and thus seat itself into the hook so as to engage several of the teeth or projections 23 as the bending pressure is applied. This has its advantages in that a gentle graduate contour of the bend in the pipe or tubing is obtained and the pinching, binding and abrasion to the protective coating which would otherwise occur is eliminated completely.

As best seen in Figs. 2 and 3, the foot treadle 25 has an eccentric contour and is formed on a rearwardly and downwardly extending plural arc so that when in the starting position of the tool, the rounded portion 27 of the treadle will be located in such a position that foot pressure applied thereto is always in a horizontal plane to the mechanic or operator, and this foot pressure is transmitted or directed to the starting portion of the groove 9, as represented by the letter "A" which portion is in the most critical need of pressure. As the bend is formed in the pipe or tubing, however, by virtue of the particular shape or formation of the treadle and the portions 26 and 27 thereof, the vertical foot pressure being applied thereto is conveniently applied without slippage of the worker's foot throughout the complete 100 degree sweep of the tool. The foot treadle 25 is of liberal width and is so shaped that it is always in a comfortable position for the reception of the mechanic's foot during the entire movement of the bending tool between 0 degrees and 100 degrees. Foot pressure must be applied or the tubing will kink because it bends outside of the groove where there is no support to keep the side walls of the tubing from collapsing.

As stated above, the double-headed arrow 24 and the peek hole 24c permit an operator or electrician to see the guide mark which he has made on the pipe to be bent so that he can make his bend accurately, no matter which side of the pipe the mark is on. As is known, it is a common occurrence for an electrician or wireman to "pencil in" his mark on the pipe to be bent, only to find that it is covered up by the hook or groove when he places the bending tool into position on the pipe. Moreover, left-handed electricians like to work from the "back" of the hook. Since the arrowhead 24a and the operator's guide mark are visible through peek hole 24c, the bender of the present invention is equally adapted for use by left-handed or right-handed operators.

After a pipe has been bent it often becomes necessary for the wireman to straighten the pipe or take out a few degrees of any bend. For this purpose, I have provided in the groove a preferably concave shoulder or so-called "back-pusher" 30, see particularly Figs. 1, 3 and 4. After making the desired bend in the pipe or tubing the operator simply moves or pushes the pipe handle 7 away from himself, or in the direction opposite to that from which he moved or pulled the handle during the pipe-bending operation, whereupon the pipe or tubing is held securely between the back-pusher groove portion or shoulder 30 and the inside end 31 of the hook 21, Fig. 3. The pipe secures itself firmly between these two portions of the bender, thereby permitting the operator to take out as much of the bend as he desires. In other words, by virtue of the provision of the "back-pusher" 30, the operator is enabled to "true up" the bend in the pipe by removing a few degrees of the arc.

In general, the bender of the present invention resembles that of my prior patent, above referred to, but has the added features recited above, namely the double-headed locating arrow 24 on the hook portion 21, the tear drop-shaped hole or opening 24c formed in one wall of the hook portion, the star points 29 preferably provided on both faces of the curved base 11, and the back-pusher portion being shown in the form of a concave shoulder 30 located at the end of the groove 9 formed in the curved base portion 11 of the bender.

I claim:

1. A pipe, raceway, rod, conduit and tubing bender, comprising a body portion, a curved base portion formed on the body portion, a work-engaging hook portion at one end of the base portion, said curved base portion providing a longitudinal arcuate groove, a curved concave shoulder with a pipe retaining lip portion adjacent the groove at one end of the curved base portion and opposite the hook portion, said shoulder being engageable with a pipe for removing a few degrees of arc from the pipe bent by the bender, said hook portion having a stationary peek hole formed therein and disposed in the region of and between the outer end of the hook portion and the curved concave shoulder with the pipe retaining lip portion, thereby permitting the operator to see guide marks on the pipe to be bent, and a double-headed locating arrow on the hook portion extending from the peek hole disposed in one side of the hook portion to the outer edge of the opposite side of said hook portion.

2. A pipe, raceway, rod, conduit and tubing bender, comprising a body portion, a curved base portion formed on the body portion, a work-engaging hook portion at one end of the base portion, said curved base portion providing a longitudinal arcuate groove, and a curved concave shoulder with a pipe retaining lip portion at one end of the longitudinal arcuate groove of the curved base portion and opposite the hook portion, said shoulder being engageable with a pipe for removing a few degrees of arc from the pipe bent by the bender.

3. A pipe, raceway, rod, conduit and tubing bender, comprising a body portion, a curved base portion formed on the body portion, a work-engaging hook portion at one end of the base portion, said curved base portion providing a longitudinal arcuate groove, and a curved concave shoulder with a pipe retaining lip portion adjacent the groove at one end of the curved base portion and opposite the hook portion, said shoulder being engageable with a pipe for removing a few degrees of arc from the pipe bent by the bender, said hook portion having a stationary peek hole formed therein between the end of the hook portion and the curved concave shoulder with the pipe retaining lip portion, thereby permitting the operator to see guide marks on the pipe to be bent.

References Cited in the file of this patent

UNITED STATES PATENTS

| | | |
|---|---|---|
| 1,379,016 | Henderson | May 24, 1921 |
| 1,613,432 | Barr | Jan. 4, 1927 |
| 1,659,026 | Henderson | Feb. 14, 1928 |
| 1,752,220 | Allen | Mar. 25, 1930 |
| 2,356,716 | Wheeler | Aug. 22, 1944 |
| 2,428,237 | McIntosh | Sept. 30, 1947 |
| 2,584,537 | Benfield | Feb. 5, 1952 |